US006109593A

United States Patent [19]

Craychee

[11] Patent Number: 6,109,593

[45] Date of Patent: *Aug. 29, 2000

[54] JACK ADAPTER

[75] Inventor: John F. Craychee, St. Charles, Ill.

[73] Assignee: Kiene Diesel Accessories, Inc., Addison, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 09/031,238

[22] Filed: Feb. 26, 1998

[51] Int. Cl.[7] .......................... B60P 1/48

[52] U.S. Cl. .................... 254/8 B; 254/133 R; 254/131; 254/DIG. 4

[58] Field of Search ............................... 254/8 B, 133 R, 254/DIG. 4, 131, 134, 100; 269/266; 5/911, 655.4, 702, 922, 490; 24/16 R, 3.13

[56] References Cited

U.S. PATENT DOCUMENTS 3,477,269 11/1969 Dinerman ............................ 254/133 R
3,762,404 10/1973 Sakita .......................................... 5/911
3,958,793 5/1976 Garate ................................. 254/133 R
3,993,268 11/1976 Greene et al. .......................... 254/8 B
4,139,920 2/1979 Evans .......................................... 5/911
4,175,728 11/1979 Ferguson ................................. 24/16 R
4,193,152 3/1980 Seibold, Jr. ................................. 5/922
4,653,727 3/1987 Chang et al. ...................... 254/DIG. 2
4,688,759 8/1987 Gray ........................................ 254/134
5,181,821 1/1993 King, Sr. ............................. 254/133 R
5,246,216 9/1993 Oberst ..................................... 269/266
5,251,875 10/1993 Craychee et al. .
5,800,094 9/1998 Jones .................................. 254/133 R

*Primary Examiner*—David A. Scherbel
*Assistant Examiner*—Lee Wilson
*Attorney, Agent, or Firm*—Dykema Gossett PLLC

[57] ABSTRACT

A jack adapter has a mounting plate with a base plate and a pair of flanges extending from the base plate. A cushion has a non-absorbent outer cover and a nonabsorbent fill material enclosed within the outer cover. The outer cover has an air release vent. The cover also has a fill opening for removing and filling the cover with material. A closure is coupled to the cover for closing the fill opening.

12 Claims, 3 Drawing Sheets

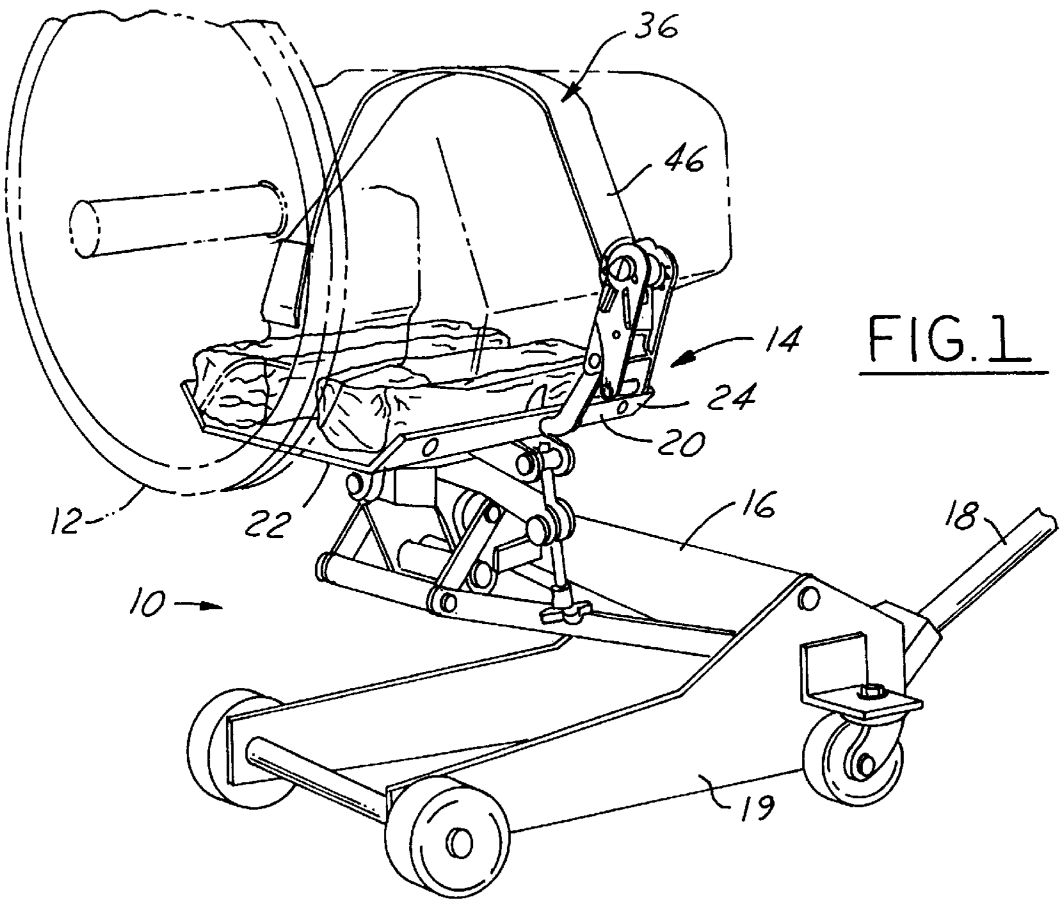
FIG. 1
FIG. 5
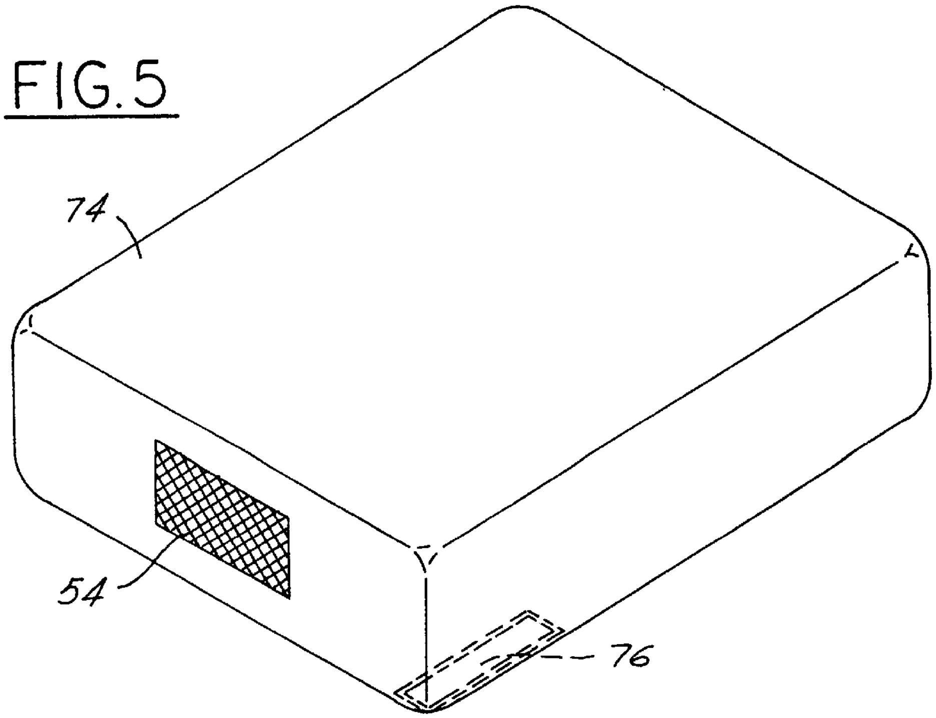

JACK ADAPTER

BACKGROUND OF THE INVENTION

The present invention relates generally to jacks or lifts used for removing components from automotive vehicles. More specifically, the present invention relates to a jack adapter used to couple an automotive vehicle component to a jack or lift.

Jacks or other lifting type devices are used to assist in the removal of heavy or bulky components from automotive vehicles.

Automotive vehicles have bulky powertrain components that include an engine, a transmission and a drive line. These components together form the means by which the automotive vehicle is propelled down the road. Each of the drive train components have a number of moving parts therein. These parts are subject to wear during operation of the vehicle. The components must, therefore, be serviced which may include removing the components from the vehicle. A jack or lift is used to assist in the removal and relocation of the components.

Transmissions have a number of gears and other parts that are subject to wear. Transmissions of automotive vehicles are typically located near the bottom of the vehicle. When transmissions are to be serviced, they are removed from the bottom of the vehicle. Typically, the vehicle is elevated prior to removal. A transmission jack is positioned beneath the transmission. Transmission jacks are commonly hydraulically operated. The transmission jack is placed beneath the transmission. The transmission is then disconnected from the drive train and engine of the automotive vehicle. The transmission jack allows the transmission to be removed and relocated conveniently. When the transmission is disconnected, the transmission is lowered to a position and moved on the transmission jack so that it may be serviced.

A cushion of some sort may be positioned between the jack and the transmission during the removal process. The cushion is made of a canvas material. Canvas, however, has several drawbacks for commercial environments. Canvas soaks up oil, grease and other fluids which makes the cushion slippery and difficult to handle. Canvas cannot be cleaned effectively. Because the canvas cannot be cleaned, the canvas will rot over time. Also, canvas does not effectively prevent punctures and tears during rigorous commercial use.

In a known cushion used for placement on a jack, the cushion was filled with chicken grit. Chicken grit is a type of fine gravel fed to chickens to help their digestive system. Chicken grit, however, absorbs oil causing the filling to be stuck together and causing the filling to breakdown. Another problem with chicken grit is that the individual pieces of gravel have rough edges. These rough edges do not allow the filling to move easily with respect to each other. When placing a transmission on a cushion, it is desirable to have the filling capable of movement to equalize the filling with respect to the irregularities of the transmission on the cushion.

Transmissions do not have uniform shapes. Commonly, the bottoms of transmissions have large irregularities or protrusions. When using a cushion between the jack and a transmission with irregularities, the transmission may be unstable on the transmission jack.

Yet another problem with using a canvas cushion is that because the cushion becomes clogged with oil, air remains trapped within the cushion when the transmission is placed upon the cushion. A considerable amount of stress is placed on the stitching on the cushion which reduces the life of the cushion.

SUMMARY OF THE INVENTION

It is therefore one object of the invention to provide a jack adapter suitable for supporting automotive components having various shapes and sizes.

It is a further object of the invention to provide a jack adapter that is formed of materials that will not absorb oils and other liquids commonly found in repair shops.

In one embodiment, a jack adapter has a base plate with a pair of flanges extending therefrom. A cushion has a non-absorbent outer covering and a nonabsorbent fill material enclosed within the outer covering. The outer covering has an air release vent. The covering also has a fill opening for removing and filling fill material. A closure is coupled to the cover for closing the fill opening and preventing inadvertent release of fill material.

In a further embodiment, the baseplate has a strap coupled thereto. The strap is used to secure the component to the baseplate.

In yet another embodiment of the invention, a plurality of slots are located on the baseplate. A plurality of fasteners may be used to couple the baseplate to the jack.

In still another embodiment of the invention, the cushion is formed of a ballistic nylon material. The fill material is formed of plastic beads. Both the ballistic nylon material and the plastic beads are not oil absorbent. The plastic beads easily move past each other to conform to the shape of the component when the component is placed on the cushion.

In yet another embodiment of the invention, a pair of cushions are used to position the transmission on the mounting plate. By providing two cushions, the shape of the cushion more easily conforms to components having irregular shaped bottoms. Providing two cushions is especially suitable for transmissions having a rounded bottom.

One advantage of the invention is that the mounting plate is easily adapted to mount to almost any jack. By securing the mounting plate to the jack, the cushions may be easily located to be positioned between the mounting plate and the component.

BRIEF DESCRIPTION OF THE DRAWINGS

Other features and advantages of the present invention will be apparent from the detailed description which should be read in conjunction with the drawings in which:

FIG. 1 is a perspective view of a transmission having a jack adapter positioned with respect to a transmission of an automotive vehicle;

FIG. 5 is a perspective view of an alternative cushion for a jack adapter;

DETAILED DESCRIPTION OF THE PREFERRED EMBODIMENT

Figure 2:
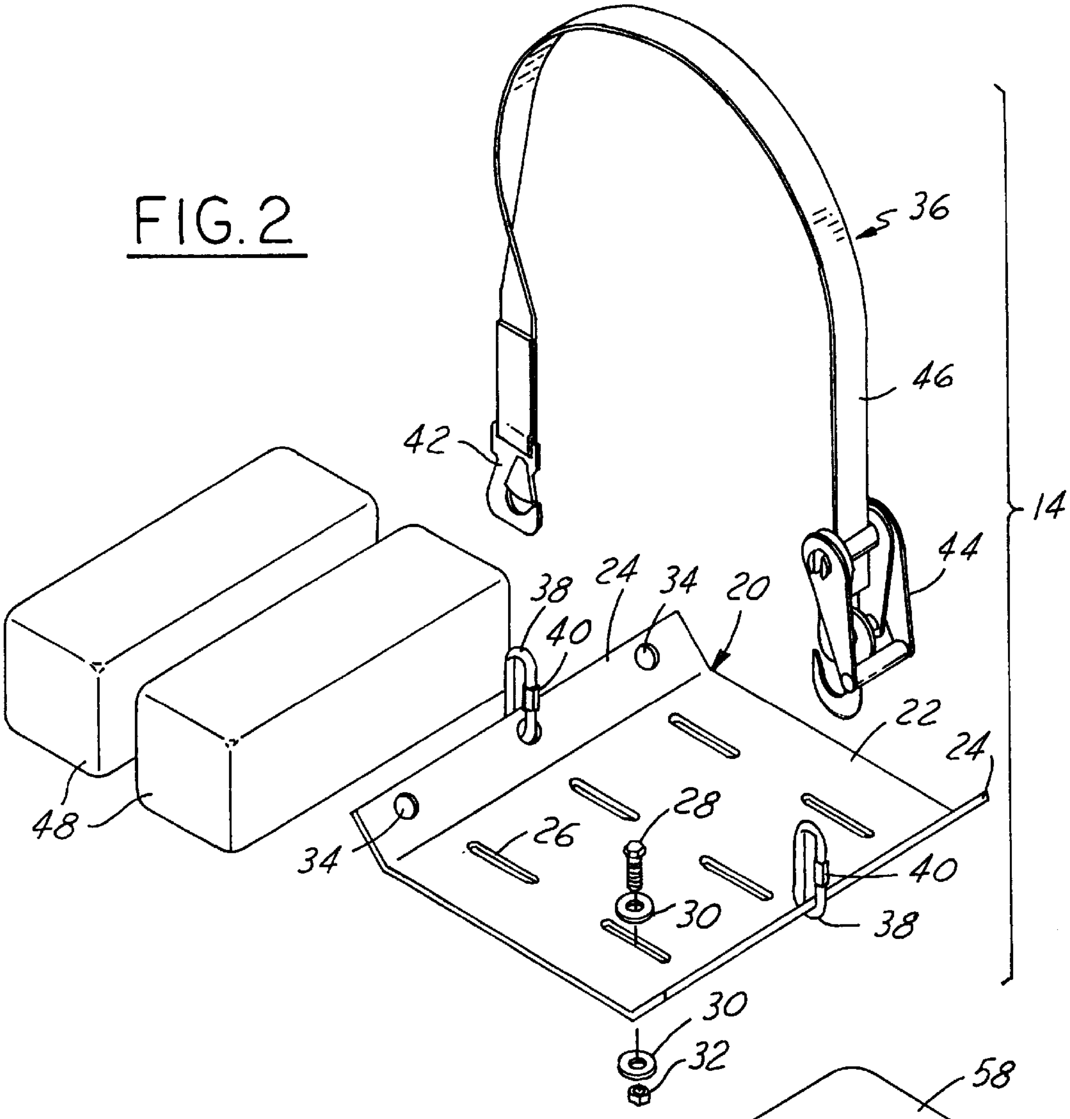
FIG. 2 is an exploded perspective view of a jack adapter according to the present invention.

Referring now to the drawings, like reference numerals are used to identify identical components in the various views. While the jack adapter is illustrated with respect to a transmission, those skilled in the art will recognize that the adapter is suitable for coupling to jacks or lifts for removing various automotive components having various sizes and shapes.

Referring now to FIG. 1, a lift or jack 10 is shown secured to an automotive transmission 12. A jack adapter 14 is used to couple the transmission 12 to jack 10. More preferably, jack adapter 14 is coupled to a lift arm 16 of jack 10. A handle 18 is used to elevate lift arm 16 from jack base 19.

Jack 10 may be one of a variety of commercially available transmission jacks. Jacks 10 are commonly hydraulic jacks. Jacks 10 are used to assist in the removal of a transmission 12 from a vehicle (not shown). Jack 10 is positioned beneath transmission 12. Once removed from the vehicle, transmission 12 may be transported to be repaired or serviced using jack 10.

One problem with transmission jacks are that because the weight of transmission 12 is so great, it is often difficult using a conventional transmission jack to safely position transmission 12 on jack 10.

Adapter 14 is used to stably secure transmission 12 to jack 10. As will be described further below, jack adapter 14 is secured to jack 10.

Referring now to FIGS. 1 and 2, jack adapter 14 has a mounting plate 20 that is secured to jack 10. Mounting plate 20 has a base 22 and a pair of flanges 24. Flanges 24 extend at an angle from base 22. Base 22 preferably has a plurality of slots 26. Slots 26 are positioned so that mounting plate 20 is easy to secure to a variety of types of jacks 10. Slots 26 are used to receive fasteners 28. Washers 30 and nut 32 may be used in combination with fastener 28 to secure mounting plate 20 through slots 26 to a jack 10. Of course, other suitable fastening means would be evident to those skilled in the art.

Some jacks 10 have a plate thereon. Mounting plate 20 may be mounted to the existing plate. Adapter 14 may use the existing plate if the plate is large enough.

Although flanges 24 are not required, flanges 24 are used to secure transmission 12 to mounting plate 20 and to assist in positioning transmission 12 onto mounting plate 20. Flanges 24 have holes 34. Holes 34 may be used to secure a safety strap 36 thereto. As shown in FIG. 1, safety strap 36 is secured directly to holes 34. Safety strap 36 may also be secured to links 38. Links 38 preferably are locked by way of a lock 40 which is used to threadedly close link 38.

Safety strap 36 has a clasp 42 and a buckle 44 coupled together by strapping 46. Buckle 44 is adjustable so that strapping 46 may be securely placed around and tightened the transmission to the mounting plate 20 during removal of the transmission from the vehicle. Strapping 46 is made of a nylon or other durable material suitable for high tension applications. Preferably, clasp 42 and buckle 44 are sewn or otherwise affixed to strapping 46.

The bottoms of transmissions and other components are commonly not smooth. That is, the components may have protrusions or be rounded on the bottom sides. Preferably, a cushion 48 or a pair of cushions 48 may be positioned between mounting plate 20 and transmission 12. Cushions 48 are positioned on mounting plate 20 prior to securing transmission 12. Cushions 48 deform when the transmission or other component is placed upon mounting plate 20. Cushion 48 compensates for any irregularities between the transmission and mounting plate. This allows a good secure connection between the transmission and the transmission jack.

Figure 3:
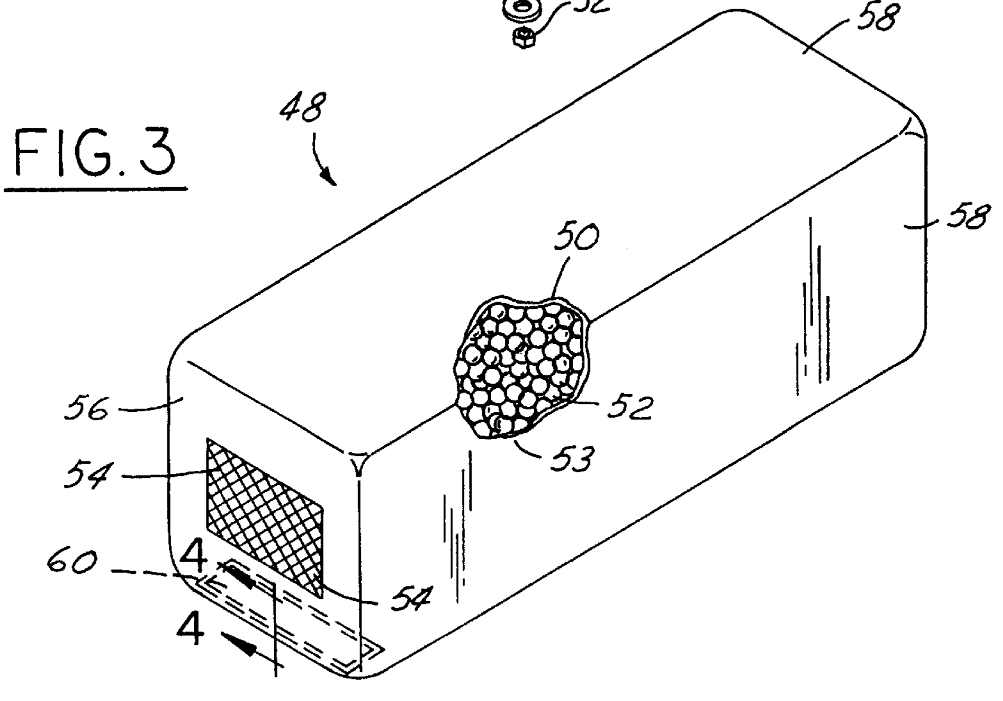
FIG. 3 is a perspective view of a cushion for a jack adapter.

Referring now to FIG. 3, a first embodiment of a cushion 48 is illustrated. In this embodiment, cushion 48 is a rectangular solid having two ends 56 and four sides 58. In one constructed embodiment, cushion 48 had a cross section of 5 inches high, 5 inches wide and a length 15 inches long. Of course, other shaped cushions 48 would be evident to those in the art. The ends 56 and sides 58 of cushions 48 are preferably sewn together.

Cushion 48 has a cover 50 which is filled with fill 52. Cover 50 is preferably formed of a non-absorbent material. More specifically, cover 50 is formed of a non-oil absorbing material such as nylon. Cover 50 is also preferably formed of a material that can be cleaned, resists puncture and tears, and will not rot. One suitable material for forming cover 50 is ballistic nylon. Another suitable material for cover 50 is 18 ounce PVC coated polyester.

Fill 52 is also preferably formed of a non-oil absorbent material. Fill 52 preferably also does not easily break down and has rounded edges 53 so that when a transmission is placed upon cushion 48, fill 52 may easily reposition itself within cushion 48 to compensate for irregularities or other protrusions. Preferably, fill 52 is formed of plastic or resin beads.

Cushions 48 preferably have at least one vent 54 therein. Vents 54 allow air from within cushion 48 to escape when the component is placed upon the cushion 48. In one constructed embodiment, a vent 54 was placed in each end 56 of cushion 48. Vent 54 was 2 inches by 3 inches. Vent 54 is formed of a mesh material to allow air to escape while retaining fill 52 within cushion 48. Of course, vents 54 may be placed on other sides of cushion 48.

Figure 4:
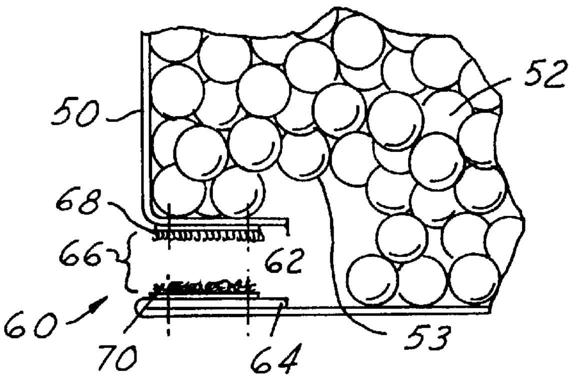
FIG. 4 is a cross-sectional view of a fill opening of cushion for a jack adapter.

Referring now to FIG. 4, cushion 48 has a resealable fill opening 60 to allow fill 52 to be placed within cover 50 during manufacture. Fill opening 60 also allows mechanics to adjust the amount of fill 52 within cover 50 depending on the type and shape of the component. Fill opening 60 has an upper flap 62 and a lower flap 64 which are preferably extensions of cover 50 into cushion 48. Upper flaps 62 and lower flaps 64 has a closure 66 coupled thereto. Closure 66 is preferably a hook and loop closure. In one constructed embodiment, a hook material 68 was coupled to upper flap 62. A loop material 70 was coupled to lower flap 64. A suitable hook material 68 is Velcro brand part number 199637. A suitable loop material 70 is Velcro brand part number 212764. The closure 66 must be capable of withstanding the weight of a component without releasing fill 52 from within cover 50. The hook material 68 and loop material 70 in the constructed embodiment were one inch wide.

Referring now to FIG. 5, a large cushion 74 is illustrated. Large cushion 74 is larger than cushion 48. Large cushion 74 may be suitable for use with components that have a flat bottom. In one constructed embodiment of a large cushion, the cushion measured 12 inches by 15 inches by 4 inches. A vent 76 is also placed in each end of large cushion 74. Vent 76 is preferably made of the same material as vent 54. For large cushion 74, the vent was 4 inches by 2 inches.

Large cushion 74 has a fill opening 76 constructed in the similar manner to that of FIGS. 3 and 4. A similar closure is also used.

Figure 6:
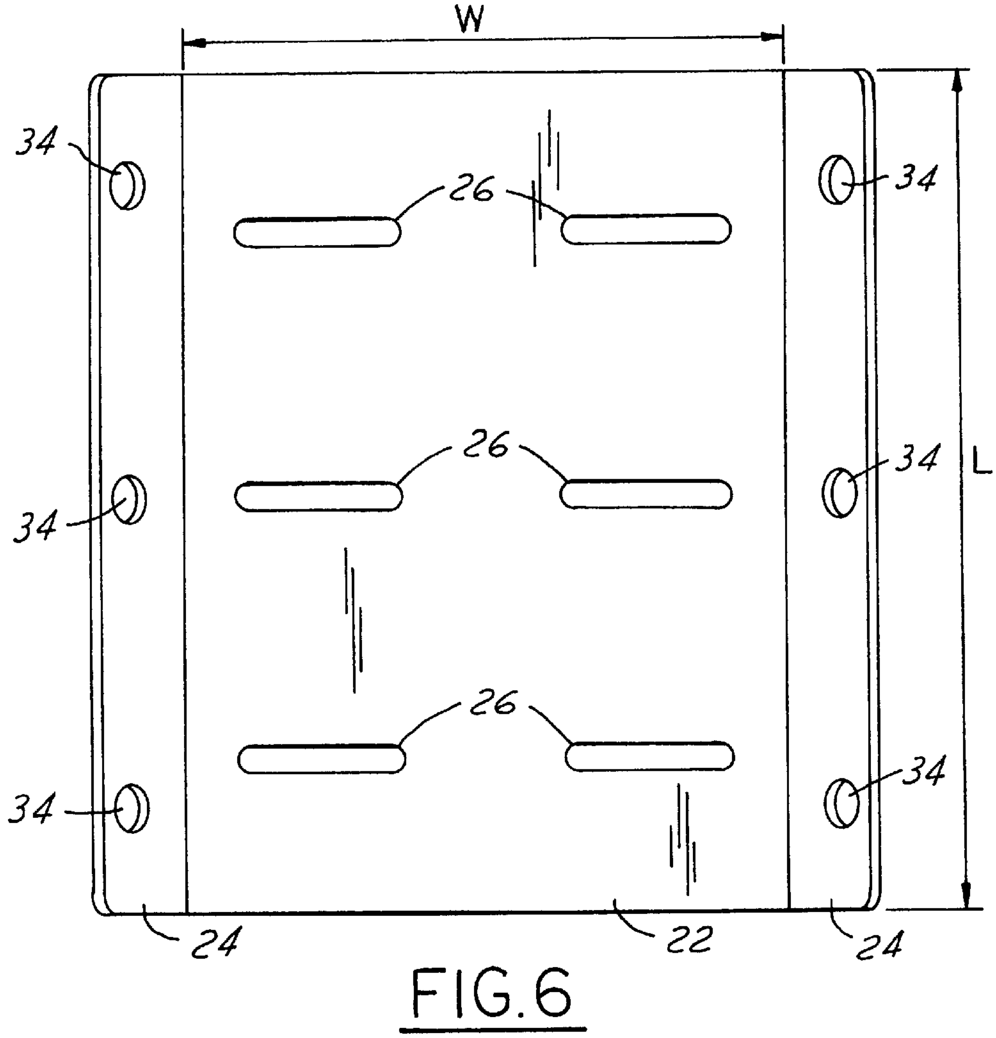
FIG. 6 is a top view of a mounting plate of a jack adapter.
Figure 7:
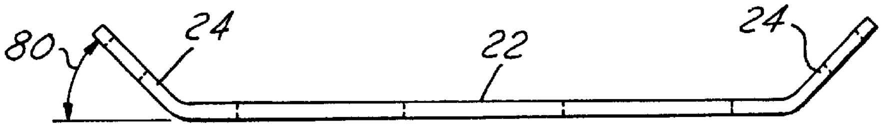
FIG. 7 is a side view of a mounting plate of a jack adapter.

Referring now to FIGS. 6 and 7, mounting plate 20 is shown. Flanges 24 are preferably at an angle 80 with respect to base 22. Angle 80 is preferably about 45 degrees. Angle 80 prevents cushions 48 or 74 from being displaced from mounting plate 20 while positioning the components. In the constructed embodiment, the length L was about 17.5 inches and the width W of base 22 was about 13 inches.

It should be understood by those skilled in the art that variations and modifications to the preferred embodiments described above may be made without departing from the true scope of the invention as defined by the following claims.

What is claimed is:

1. A jack adapter for supporting an automotive component, said jack adapter comprising:

a base plate;

means for connecting said base plate to a jack;

a bag attached to said base plate;

said bag having a non-absorbent outer surface which does not absorb oil;

said bag forming an enclosure for containing a fill material;

a fill material disposed inside said bag in said enclosure, said fill material being a plurality of non-absorbent beads, wherein said beads do not absorb oil;

said beads being present in said enclosure in a volume which allows said bag to assume a shape which mates with a portion of an automotive component placed thereon;

said bag further having a two-way air vent which is continuously open to atmosphere for allowing air to freely move in and out of said bag; and means for attaching said bag to said baseplate.

2. A jack adapter assembly as recited in claim 1, wherein said bag has a fill opening which is resealable.

3. A jack adapter assembly as recited in claim 2, wherein said fill opening has a hook and loop closure.

4. A jack adapter assembly as recited in claim 1, wherein said air-release vent is comprised of a mesh material.

5. A jack adapter assembly as recited in claim 1, wherein said bag is formed of nylon.

6. A jack adapter assembly as recited in claim 1, wherein said bag is formed of polyester coated polyvinylchloride.

7. A jack adapter assembly as recited in claim 1, wherein said beads are plastic.

8. A jack adapter assembly as recited in claim 1, wherein said beads have rounded edges.

9. A jack adapter assembly as recited in claim 1, wherein said base plate has a plurality of slots.

10. A jack adapter assembly as recited in claim 1, wherein said base plate has a pair of flanges extending from opposite edges of said base plate.

11. A jack adapter assembly as recited in claim 1, further comprising a safety strap for securing said bag to said base plate.

12. A jack assembly as recited in claim 1, further including a hydraulic jack attached to said base plate.

* * * * *